US012000173B1

(12) United States Patent
Tobias et al.

(10) Patent No.: US 12,000,173 B1
(45) Date of Patent: Jun. 4, 2024

(54) SYSTEM INCLUDING AUDIT ENHANCEMENT ASSEMBLY WITH ENHANCED SENSING CAPABILITY

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

( * ) Notice: Subject to any disclaimer, the term of this patent is extended or adjusted under 35 U.S.C. 154(b) by 0 days.

(21) Appl. No.: 18/383,970

(22) Filed: Oct. 26, 2023

Related U.S. Application Data

(60) Provisional application No. 63/420,148, filed on Oct. 28, 2022.

(51) Int. Cl.

| | |
|---|---|
| ***E05B 39/04*** | (2006.01) |
| ***E05B 17/22*** | (2006.01) |
| ***E05B 19/00*** | (2006.01) |
| ***E05B 19/22*** | (2006.01) |
| ***E05B 47/00*** | (2006.01) |
| ***E05B 49/00*** | (2006.01) |

(52) U.S. Cl.
CPC .............. *E05B 39/04* (2013.01); *E05B 17/22* (2013.01); *E05B 19/0011* (2013.01); *E05B 19/22* (2013.01); *E05B 49/002* (2013.01); *E05B 2047/0067* (2013.01); *E05B 2047/0084* (2013.01)

(58) Field of Classification Search
CPC .... E05B 17/103; E05B 17/22; E05B 19/0011; E05B 19/0088; E05B 19/04; E05B 19/22; E05B 19/24; E05B 39/04; E05B 49/00; E05B 49/002; E05B 2047/0048; E05B 2047/0063; E05B 2047/0067; E05B 2047/0069; E05B 2047/0083; E05B 2047/0084; E05B 2047/0088
See application file for complete search history.

(56) References Cited

U.S. PATENT DOCUMENTS 8,085,125 B2 * 12/2011 Bigdely Shamlo ..... E05B 19/22 340/5.2
8,269,644 B2 * 9/2012 Weinstein ............... E05B 19/22 70/438

(Continued)

OTHER PUBLICATIONS

"A Nano-Scale Graphene Accelerometer", Advanced Science News website, Martin Grolms, Sep. 24, 2019.

*Primary Examiner* — Christopher J Boswell
(74) *Attorney, Agent, or Firm* — Jeffrey A. Proehl; Woods, Fuller, Shultz & Smith, PC

(57) ABSTRACT

A system may include a lock assembly having a shell and a plug rotatable with respect to the shell and a lock operating object for operating the lock assembly including a key. The system may further include an audit enhancement assembly configured to facilitate creation of an audit trail of operation of the lock assembly by the lock operating object, and may include a motion sensor configured to sense rotational motion of the lock operating object and/or the plug of the lock assembly. The audit enhancement assembly may include processing circuitry in communication with the motion sensor, and memory circuitry in communication with the processing circuitry to receive and record a value derived from a motion signal from the motion sensor and a temporal value associated with a motion signal event.

18 Claims, 3 Drawing Sheets

(56) References Cited

U.S. PATENT DOCUMENTS

| | | | | |
|---|---|---|---|---|
| 8,334,765 | B2 * | 12/2012 | Weinstein | E05B 19/22 340/5.1 |
| 8,390,448 | B2 * | 3/2013 | Weinstein | E05B 19/22 340/407.1 |
| 8,775,012 | B2 * | 7/2014 | Podolak | E05B 19/00 701/31.4 |
| 9,642,220 | B1 * | 5/2017 | Vang | E05B 19/04 |
| 10,443,267 | B2 | 10/2019 | Tobias | |
| 2009/0293567 | A1 * | 12/2009 | Yuen | E05B 19/22 73/488 |

* cited by examiner

SYSTEM INCLUDING AUDIT ENHANCEMENT ASSEMBLY WITH ENHANCED SENSING CAPABILITY

BACKGROUND

Field

The present disclosure relates to lock systems and more particularly pertains to a new system including an audit enhancement assembly with enhanced sensing capability for providing enhanced information such as the use of the lock operating object.

SUMMARY

In one aspect, the present disclosure relates to a lock operating object for operating a lock assembly for securing an object, and the lock assembly may have a shell and a plug rotatable with respect to the shell. The lock operating object may comprise a key and an audit enhancement assembly mounted on the key and configured to facilitate creation of an audit trail of operation of the lock assembly by the lock operating object. The audit enhancement assembly may comprise a motion sensor mounted on the key and configured to sense motion of the lock operating object, with the motion sensor being configured to produce a motion signal. The lock operating object may also include processing circuitry in communication with the motion sensor to receive the motion signal from the motion sensor upon occurrence of a motion signal event, and the processing circuitry may be configured to associate a value derived from the motion signal with a temporal value. The lock operating object may further include memory circuitry in communication with the processing circuitry to receive and record the value derived from the motion signal and the temporal value associated with the motion signal event.

In another aspect, the present disclosure relates to a system that may comprise a lock assembly configured to secure an object, and the lock assembly may have a secured condition and an unsecured condition. The lock assembly may comprise a shell and a plug rotatable with respect to the shell. The system may further a lock operating object for operating the lock assembly, and may comprise a key. The system may also include an audit enhancement assembly configured to facilitate creation of an audit trail of operation of the lock assembly by the lock operating object. The audit enhancement assembly may comprise a motion sensor configured to sense a rotational motion of the lock operating object or the plug of the lock assembly when operated by the lock operating object.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
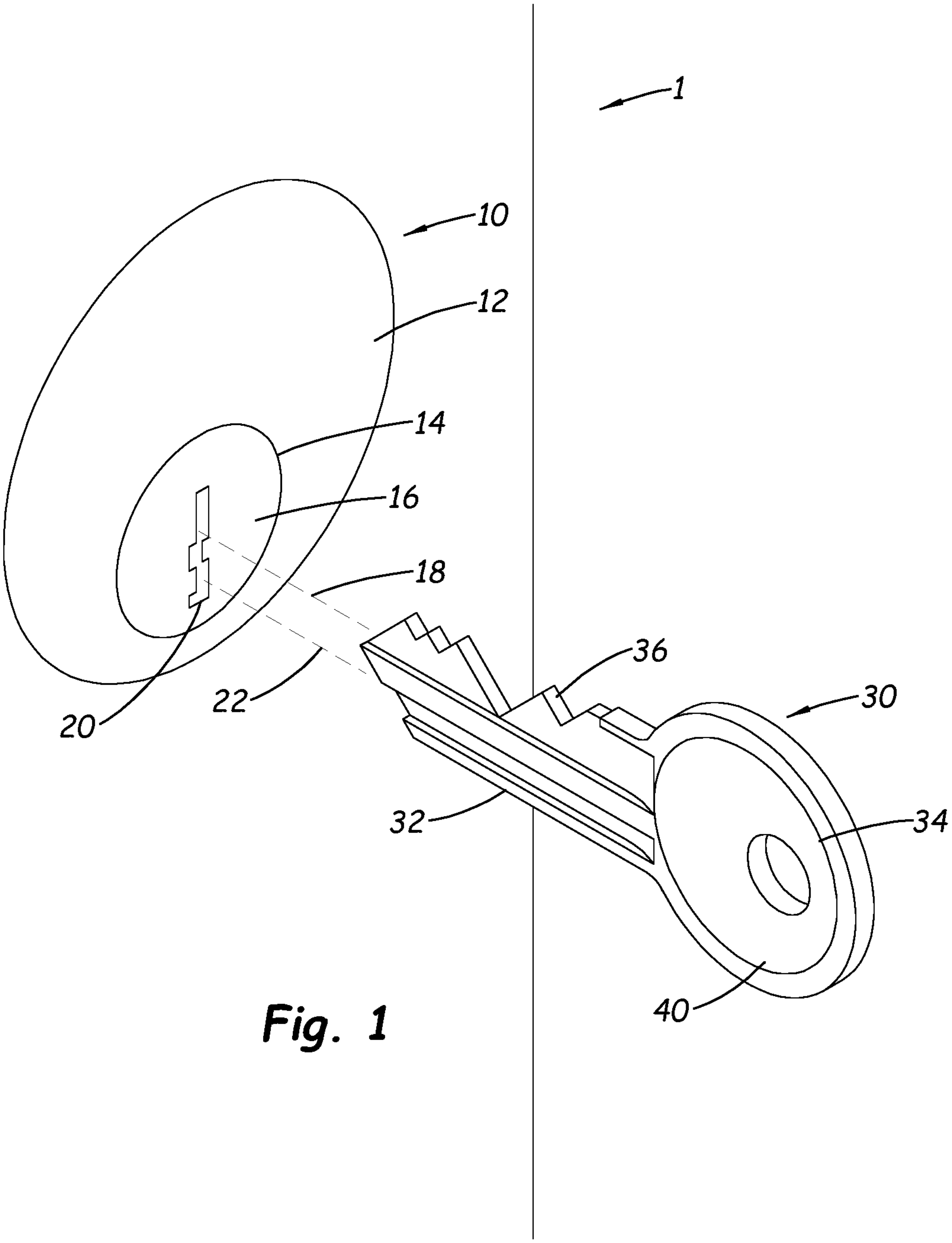
FIG. 1 is a schematic perspective view of a new system including an audit enhancement assembly with an enhanced sensing capability according to the present disclosure.
Figure 2:
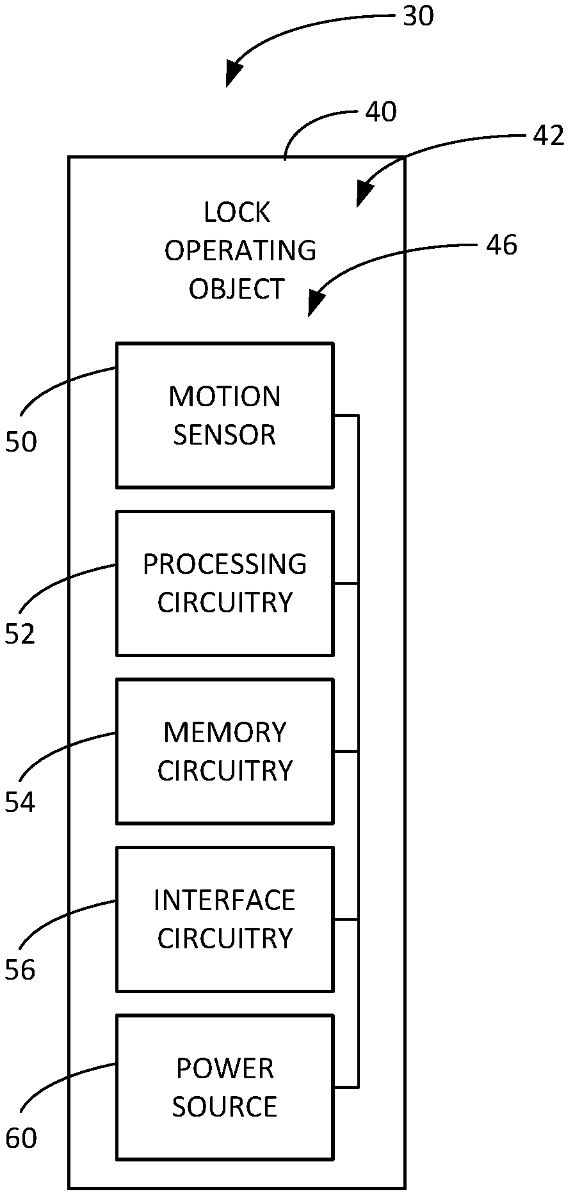
FIG. 2 is a schematic diagram showing elements of the audit enhancement assembly incorporated with the lock operating object of the system, according to an illustrative embodiment.
Figure 3:
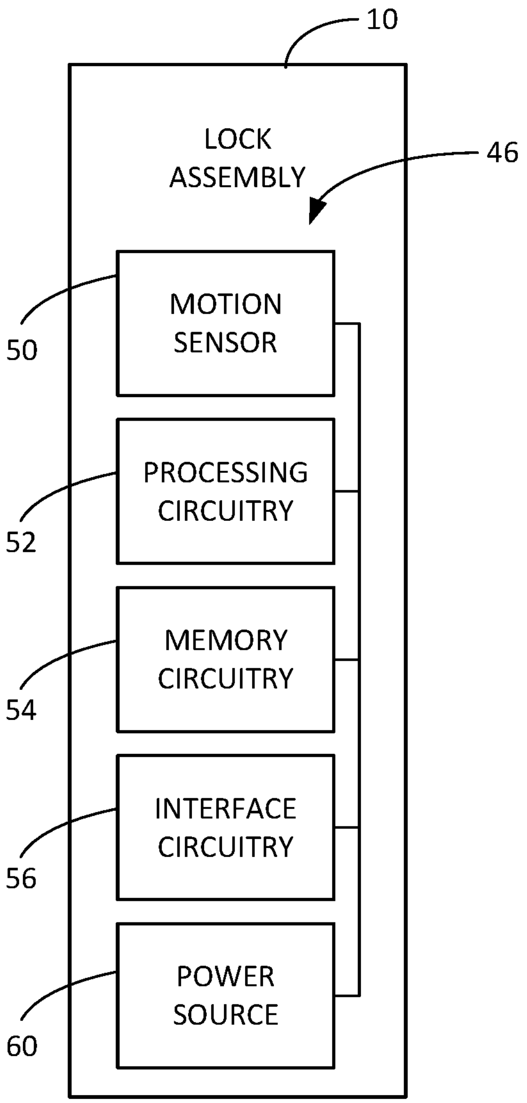
FIG. 3 is a schematic diagram showing elements of the audit enhancement assembly incorporated with the lock assembly of the system, according to an illustrative embodiment.

With reference now to the drawings, and in particular to FIGS. 1 through 3 thereof, a new system including an audit enhancement assembly with enhanced sensing capability that embodies the principles and concepts of the disclosed subject matter will be described.

The applicants have recognized that, in situations involving alleged compromise of security devices such as lock assemblies, an audit trail or history of the use of a lock operating object to operate a lock assembly can be important in determining the occurrence and sequence of events. Lock assemblies, and particularly electronics-based lock assemblies, may provide some type of audit trail of when the lock assembly was operated. However, the applicants are unaware of any previous designs in which a lock operating object incorporating a key for operating a lock assembly included the ability to sense and record the motion of the operating object itself that may be associated with operating a lock to "lock" the lock assembly, or operating the lock to a "unlock" the lock assembly. The applicants are unaware of, for example, lock operating objects which incorporate a key that are able to sense and record, for example, the rotational motion of the key typically associated with rotating the plug element of the lock assembly by the key to initiate a locked condition of the lock assembly, or rotational motion of the key typically associated with rotating the plug element by the key to initiate an unlocked condition of the lock assembly. Typically, such rotational motion of the key occurs about a longitudinal axis of the key of the lock operating object, and the axis of the key is generally oriented parallel to a rotational axis of the plug element of the lock assembly. The applicants have recognized that information which may include the time and characteristic of motion of the lock operating object, particularly if available as an audit trail after the event, could be extremely useful in investigating alleged compromises of security devices such as lock assemblies.

The applicants have also recognized that, in some electromechanical locks, the ability to generate an audit trail by components of the lock assembly may be defeated, and in some cases this may be accomplished as easily as removing the power source (e.g., battery) from the key used to operate the lock. Without power, the circuitry of the key is incapable of generating an audit trail due to the inability to sense, process, and/or store characteristics of an event. Some covert techniques to compromise the lock may then be utilized without an audit trail being generated to evidence aspects of the attack on the lock. Moreover, the applicants understand that audit trails can be very important in criminal investigations involving access to a room, area, or facility by providing a record of operation of the lock by which particular key and at what time. Of further importance is the ability to determine whether a door was locked or left unlocked prior to an unauthorized entry, or even double locked (in which more than one rotational movement of a lock actuating element in the same rotational direction produces different or additional operations by the lock mechanism).

In one aspect, the disclosure relates to a system 1 which may have an enhanced sensing capability or capabilities which may be particularly useful for recording and recalling historical elements of the operation of the system. In general, the system 1 may include a lock assembly 10 which may be utilized to secure an object in some manner and/or a lock operating object 30 which may be utilized to operate or change the condition of the lock assembly. In the illustrative embodiments of this disclosure, the lock assembly 10 may be utilized on a closure element of a building structure, such as a door, to secure the door in a closed condition to restrict movement through the opening in which the closure element is associated. Further, in the illustrative embodiments of this disclosure, the lock operating object 30 may comprise an enhanced key utilized to physically operate or manipulate elements of the lock assembly when the enhanced key includes proper authorizing features, such as bitting that is suitable to correctly move elements of the assembly 10.

The lock assembly 10 may be operated between a secured condition and an unsecured condition. The secured condition may provide securing of the object intended to be secured by the assembly 10, such as by the extending of a deadbolt or blocking of movement of a latch, and may be referred to as a locked condition. Conversely, the unsecured condition may remove the securing of the object by the assembly 10, such as by the retraction of the deadbolt or the unblocking or permitting of movement of the latch, and may be referred to as an unlocked condition.

In some greater detail, the lock assembly 10 may include a shell 12 which may define a cavity 14. Illustratively, the shell 12, typically as part of a larger assemblage, may be mounted on a larger object or structure, such as a door, and may remain relatively stationary with respect to the object or structure. The lock assembly 10 may further include a plug 16 mounted on the shell 12 in a manner which permits movement of the plug with respect to the shell. In the illustrative embodiments, the plug 16 may be rotatable with respect to the shell 12, such as about a plug rotation axis 18. The plug 16 may have a primary orientation with respect to the shell 12 position, and the plug may be rotatable from the primary orientation in a first rotational movement direction and in a second rotational movement direction with respect to the plug. The first rotational movement direction may be oriented or directed substantially opposite of the second rotational movement direction. For example, the first rotational movement direction may cause the plug to rotate in a clockwise direction, and the second rotational movement direction may cause the plug to rotate in a counterclockwise direction. Illustratively, rotation of the plug by the lock operating object 30 in the first rotational movement direction may produce a changing of the condition of the lock assembly from an unsecured condition to a secured condition, and rotation of the plug by the object 30 in the second rotational movement direction may produce a changing of the condition of the lock assembly from a secured condition to an unsecured condition. Optionally, the change in the condition of the lock assembly produced by the rotational directions may be the reverse. The plug 16 may define a keyway 20 which may be elongated along a longitudinal axis 22 which extends into the plug and may be oriented substantially parallel to the plug rotation axis.

The lock operating object 30 of the system may comprise a key 32 for mechanically interacting with a lock assembly, such as with the plug 16 of the lock assembly, to move or rotate the plug with respect to the shell 12 between the secured and unsecured conditions of the assembly 10. The key 32 may include a bow portion 34 which may be configured to be gripped by the hand of a user and which typically remains outside of the lock assembly when the object 30 is engaged with the assembly to operate it. The key 32 may further include a blade portion 36 which extends from the bow portion and may be at least partially insertable into the keyway 20 of the plug of the lock assembly. The blade portion 36 may be elongated to facilitate insertion into the keyway and may have a longitudinal direction or axis extending in the direction of elongation. The longitudinal direction or axis of the blade portion 36 of the key may be oriented substantially parallel to the longitudinal axis 22 of the keyway when the blade portion 36 is inserted in the keyway of the plug of the lock assembly for operating the assembly.

The lock operating object 30 may further include a housing or case 40 which is mounted on the key 32, and more particularly may be on the bow portion 34 of the key. The case 40 may define and may enclose a case interior 42 in which elements of the lock operating device 30 are positioned. In some highly preferred optional embodiments, the case 40 is integrated with the key 32 in a manner such that attempts to remove or separate the case from the key results in detectable damage or even destruction of the case.

Significantly, the system 1 may additionally include an audit enhancement assembly 46 which is configured to facilitate creation and maintenance of an audit trail for operation of the lock assembly 10, such as by the lock operating object 30, and in particular may be configured to sense movements of the lock assembly and/or movement of the lock operating object with the lock assembly during operation of the lock assembly between locked and unlocked conditions such as by rotation of the plug 16 with respect to the shell 12 of the lock assembly by the key 32. At least some of the elements of the audit enhancement assembly 46 may be mounted on components of the lock assembly 10 and/or the lock operating object 30 in a manner that permits the assembly 46 to be capable of sensing rotational movement of the components of the lock assembly and/or the lock operating object that may be indicative of operation of the lock assembly by the lock operating object between locked and unlocked conditions.

In some embodiments, elements of the audit enhancement assembly 46 may be incorporated with the lock operating object 30, and illustratively may be mounted on the case 40 associated with the key 32. In some embodiments, elements of the audit enhancement assembly 46 may be incorporated with the lock assembly 10, and illustratively some elements of the assembly 46 may be mounted on the plug 16 of the assembly 10. In still further embodiments, an audit enhancement assembly may be incorporated into both the lock assembly 10 and the lock operating object 30 utilized to operate the lock assembly to further enhance the likelihood of providing a full and secure audit trail.

The audit enhancement assembly 46 may include a motion sensor 50 configured to sense motion or movement of the object 30, or motion or movement of the plug 16 of the lock assembly, such as when the object 30 is utilized to engage or operate the lock assembly 10. The motion sensor 50 may be configured to detect rotational motion of the lock operating object 30 or the plug 16, and may detect, for example, rotational motion of the object 30 or the plug 16 in a first rotational direction when the object is engaged with the lock assembly, such as rotation about the plug rotation axis 18 of the plug (for example, clockwise). The motion sensor 50 may be configured to detect rotational motion of the lock operating object 30 or the plug 16 in a second rotational direction when the object is engaged with the lock assembly, such as rotation about the plug rotation axis of the plug (for example, counter-clockwise).

The motion sensor 50 may be configured to generate a motion signal, and the motion signal may be indicative of a rotational direction of rotational motion detected of the lock operating object or the plug 16 of the lock assembly. In some implementations, the motion signal may have a first value for indicating detected rotation of the lock operating object or plug in the first rotational direction, and the motion signal may have a second value for indicating detected rotation of the lock operating object or plug in the second rotational direction. Optionally, the motion sensor 50 may be of a type capable of detecting types of motion in addition to rotational motion, such as motion of the object 30 in the longitudinal direction of the blade portion 36 or the plug 16 in a direction along the plug rotation axis 18 which may be associated with attempts to utilize the object 30 to "bump," or impart a quick high-impact impulse or shock to the plug and other components of the lock assembly via the object 30.

In one illustrative embodiment, the motion sensor 50 may be mounted on the case 40, and may be positioned in the case interior 42, in a manner that permits the motion sensor 50 to move as a unit with the case and with the key on which the case is mounted, to facilitate detection by the motion sensor of the character of the movement of the object 30. In another illustrative embodiment, the motion sensor 50 may be mounted on the plug 16 in a manner that permits the motion sensor 50 to move with the shell to facilitate detection by the motion sensor of the movement of the plug.

In some highly preferred, but illustrative, embodiments, the motion sensor 50 may comprise an accelerometer which may be configured to detect rotational movement of the lock operating object 30 or the plug of the lock assembly about an axis coaxial with, or parallel to, the plug rotation axis 18 or the longitudinal axis 22 of the keyway when the object 30 is engaged with the lock assembly 10. Optionally, the accelerometer of the motion sensor 50 may be capable of detecting other types or orientations of movement in addition to rotational movement. Illustratively, the accelerometer may be a 3-axis accelerometer. Those skilled in the art will recognize technologies which provide miniaturized and highly miniaturized accelerometers such as, for example, graphene-based accelerometers.

The audit enhancement assembly 46 may further include other operational elements such as, for example, processing circuitry 52 which is configured to operate elements of the assembly 46. The processing circuitry 52 may be in communication with the motion sensor 50 to receive the motion signal associated with a motion sensor event from the motion sensor, such as when motion is sensed by the sensor or is otherwise suitably triggered. Further, the processing circuitry being configured to generate and/or associate a temporal value with a time of receiving a motion signal event from the motion sensor for providing a time stamp for the value of the motion signal. In embodiments, the processing circuitry 52 may be positioned on the case 40, such as being positioned in the case interior 42. In further embodiments, the processing circuitry 52 may be positioned on the plug 16, or on other elements of the lock assembly 10 such as the shell 12.

The audit enhancement assembly 46 may also include memory circuitry 54 in communication with the processing circuitry 52, and the memory circuitry may be configured to receive and record data including motion signal events including the values of motion signals and the temporal values associated with the motion signals. The memory circuitry 54 may store a log or record of instances of the motion signals, such as the motion signal values and corresponding temporal values. The memory circuitry 54 may be positioned in the case interior 42 of the case, or may be positioned on an element of the lock assembly, such as the shell 12.

Other circuitry of the audit enhancement assembly 46 may include interface circuitry 56 configured to provide the capability to communicate data from the processor circuitry and/or the memory circuitry to a location external to the assembly 46 and, for example, the lock assembly or the operating object. The interface circuitry 56 may include electrical contacts located on the case 40 which permit direct conductive communication, and/or the interface circuitry may include wireless communication circuitry using, for example, an external inductive energizing source.

The audit enhancement assembly 46 may include a power source 60 for powering elements of the object 30, and may be mounted on the case 40 and located in the case interior 42, or may be mounted on the lock assembly, such as on the shell 12. Illustratively, the power source 60 may comprise a battery, and the battery may be rechargeable. The battery of the power source 60 may be recharged in any suitable manner, and in some embodiments recharging of the battery may be conducted by induction via an external power source or a power source associated with the lock assembly. Optionally, the power source 60 may omit a battery and simply receive power (e.g. via induction) from the lock assembly, such as when the lock operating object 30 is proximate to the lock assembly. Advantageously, the power source 60 may be dedicated to providing power to motion sensor 50, the processing circuitry 52 and the memory circuitry 54 utilized on the object 30 for generating and storing an audit trail including the motions or movements of the object 30. Thus, the power source 60 may be separate from other power sources of the lock operating object 30, or the lock assembly 10, and in particular may comprise power sources that may not be readily removed from the object 30 or assembly 10, or otherwise be disconnected from the circuitry, to thereby avoid defeating the generation of an audit trail by removing power from the motion sensor, processing circuitry, and memory circuitry of the object 30 or assembly 10. In some highly preferred embodiments, the power source 60 may be permanently integrated with, for example, the case 40 of the lock operating object or the lock assembly in a manner that does not permit removal of the power source without substantial disassembly of the elements of the assembly 10 or object 30, or even destruction of elements of the assembly or object.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A lock operating object for operating a lock assembly for securing an object, the lock assembly having a shell and a plug rotatable with respect to the shell, the lock operating object comprising:

a key; and an audit enhancement assembly mounted on the key and configured to facilitate creation of an audit trail of operation of the lock assembly by the lock operating object, the wanton audit enhancement assembly comprising:

a motion sensor mounted on the key and configured to sense motion of the lock operating object, the motion sensor being configured to produce a motion signal;

processing circuitry in communication with the motion sensor to receive the motion signal from the motion sensor upon occurrence of a motion sensor event, the processing circuitry being configured to associate a value derived from the motion signal with a temporal value; and memory circuitry in communication with the processing circuitry to receive and record the value derived from the motion signal and the temporal value associated with the motion signal event in a log of motion signal events with motion signal values and temporal values corresponding to each of the motion signal events to form the audit trail.

2. The object of claim 1 wherein the key is elongated with a longitudinal axis; and wherein the motion sensor of the audit enhancement assembly is configured to sense rotational motion of the key about the longitudinal axis of the key and produce a said motion signal.

3. The object of claim 2 wherein the motion sensor of the audit enhancement assembly is configured to sense a direction of rotational motion of the key in a first rotational direction and a second rotational direction, the first and second rotational directions being opposite directions, the motion sensor producing a said motion signal with a first value when a motion sensor event with rotational motion in the first rotational direction is sensed and a second value when a motion sensor event with rotational motion in the second rotational direction is sensed.

4. The object of claim 1 wherein audit enhancement assembly includes interface circuitry configured to permit communication of a data from the processor circuitry.

5. The system of claim 1 wherein the motion sensor of the audit enhancement assembly is configured to sense motion of the key in a longitudinal direction of the key.

6. A system comprising:

a lock assembly configured to secure an object, the lock assembly having a secured condition and an unsecured condition, the lock assembly comprising a shell and a plug rotatable with respect to the shell; and a lock operating object for operating the lock assembly; and an audit enhancement assembly configured to facilitate creation of an audit trail of operation of the lock assembly by the lock operating object, the audit enhancement assembly comprising:

a motion sensor configured to sense a rotational motion of the lock operating object or the plug of the lock assembly when operated by the lock operating object;

processing circuitry in communication with the motion sensor to receive a motion signal associated with a motion sensor event from the motion sensor, the processing circuitry being configured to associate a value derived from the motion signal with a temporal value of the motion signal event; and memory circuitry in communication with the processing circuitry to receive and record the value derived from the motion signal and the temporal value associated with the motion signal event in a log of motion signal events with motion signal values and temporal values corresponding to each of the motion signal events to form the audit trail.

7. The system of claim 6, wherein the motion sensor of the audit enhancement assembly is mounted on the lock operating object.

8. The system of claim 6, wherein the motion sensor of the audit enhancement assembly is mounted on the plug of the lock assembly.

9. The system of claim 6, wherein the motion sensor of the audit enhancement assembly is configured to detect rotational motion associated with operation of the lock assembly by the lock operating object.

10. The system of claim 9 wherein the motion sensor of the audit enhancement assembly is configured to detect rotational motion of the plug of the lock assembly in a first rotational direction when the lock operating object is engaged with the shell of the lock assembly and configured to detect rotational motion of the shell of the lock assembly by the lock operating object in a second rotational direction when the lock operating object is engaged with the shell of the lock assembly.

11. The system of claim 9 wherein the motion sensor of the audit enhancement assembly is mounted on the plug of the lock operating object and the motion sensor is configured to detect rotational motion of the plug with respect to the shell of the lock assembly.

12. The system of claim 9 wherein the lock operating object comprises a key:

wherein the motion sensor of the audit enhancement assembly is mounted on the key of the lock operating object, the key being elongated with a longitudinal axis; and wherein the motion sensor of the audit enhancement assembly is configured to sense rotational motion of the key about the longitudinal axis of the key and produce a said motion signal.

13. The system of claim 12 wherein the motion sensor of the audit enhancement assembly is configured to sense a direction of rotational motion of the key in a first rotational direction and a second rotational direction, the first and second rotational directions being opposite directions, the motion sensor producing a said motion signal with a first value when a motion sensor event with rotational motion in the first rotational direction is sensed and a second value when a motion sensor event with rotational motion in the second rotational direction is sensed.

14. The system of claim 12 wherein the audit enhancement assembly includes a power source, the power source being configured to receive power from the lock assembly when the lock operating object is located proximate to the lock assembly.

15. The system of claim 14 wherein the power source of the audit enhancement assembly is configured to receive power from the lock assembly when the key of the lock operating object is inserted into the plug of the lock assembly.

16. The system of claim 6 wherein the audit enhancement assembly further comprises:

proximity circuitry configured to detect proximity of the lock operating object to the lock assembly, the proximity circuitry being in communication with the processing circuitry to indicate the proximity of the lock operating object and the lock assembly to the processing circuitry.

17. The system of claim 6 wherein the motion sensor of the audit enhancement assembly is configured to sense motion of the lock operating object in a longitudinal direction of the object.

18. The system of claim 6 wherein the audit enhancement assembly further comprises:

interface circuitry configured to provide access to permit communication of data from the processor circuitry and the memory circuitry to a location external to the audit enhancement assembly.

* * * * *